(12) United States Patent
Fujiwara et al.

(10) Patent No.: US 11,178,370 B2
(45) Date of Patent: Nov. 16, 2021

(54) IMAGE CORRECTION DEVICE, IMAGING DEVICE, IMAGE CORRECTION METHOD, AND IMAGE CORRECTION PROGRAM

(71) Applicant: FUJIFILM Corporation, Tokyo (JP)

(72) Inventors: Shinya Fujiwara, Saitama (JP); Akihiro Uchida, Saitama (JP); Kosuke Irie, Saitama (JP); Koichi Tanaka, Saitama (JP); Shinichiro Fujiki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/950,190

(22) Filed: Nov. 17, 2020

(65) Prior Publication Data

US 2021/0076019 A1 Mar. 11, 2021

Related U.S. Application Data

(63) Continuation of application No. PCT/JP2019/019311, filed on May 15, 2019.

(30) Foreign Application Priority Data

Jul. 3, 2018 (JP) .............................. JP2018-126970

(51) Int. Cl.
*H04N 9/64* (2006.01)
*H04N 5/232* (2006.01)
*H04N 5/265* (2006.01)

(52) U.S. Cl.
CPC .......... *H04N 9/646* (2013.01); *H04N 5/23229* (2013.01); *H04N 5/265* (2013.01); *H04N 9/643* (2013.01)

(58) Field of Classification Search
CPC ........ H04N 9/646; H04N 9/735; H04N 9/643; H04N 9/045; H04N 5/23229; H04N 5/265;

(Continued)

(56) References Cited

U.S. PATENT DOCUMENTS

2014/0126881 A1* 5/2014 Yoneda .............. H04N 21/2665
386/241
2016/0210728 A1* 7/2016 Tojo ................... G06K 9/00295

FOREIGN PATENT DOCUMENTS

JP 2016134803 A 7/2016
JP 2017184132 A 10/2017
(Continued)

OTHER PUBLICATIONS

International Search Report issued in PCT/JP2019/019311; dated Aug. 20, 2019.
(Continued)

*Primary Examiner* — Nelson D. Hernández Hernández
(74) *Attorney, Agent, or Firm* — Studebaker & Brackett PC

(57) ABSTRACT

An image correction device includes a reception unit, a detection unit and a correction unit. The reception unit receives a first-image and a second-image, which are obtained by a first-imaging device and a second-imaging device, and an imaging condition that is at least one piece of information on an imaging date and time or information on an imaging location corresponding to each of the first-image and the second-image. The detection unit detects the same scene between images indicated by the first-image and the second-image based on the imaging conditions corresponding to each of the first-image and the second-image. The correction unit extracts, from each of the images indicated by the first-image and the second-image corresponding to the same scene, a common subject which is common between the images, and performs, on the corresponding image, color correction of making colors of the extracted common subject similar to each other.

20 Claims, 11 Drawing Sheets

(58) Field of Classification Search
CPC ........ H04N 5/2625; H04N 5/91; H04N 5/247;
H04N 1/60
See application file for complete search history.

(56) References Cited

FOREIGN PATENT DOCUMENTS

| | | |
|---|---|---|
| JP | 2017200200 A | 11/2017 |
| WO | 2013161319 A1 | 10/2013 |

OTHER PUBLICATIONS

International Preliminary Report on Patentability and Written Opinion issued in PCT/JP2019/019311; dated Jan. 5, 2021.

\* cited by examiner

IMAGE CORRECTION DEVICE, IMAGING DEVICE, IMAGE CORRECTION METHOD, AND IMAGE CORRECTION PROGRAM

CROSS-REFERENCE TO RELATED APPLICATIONS

This application is a Continuation of PCT International Application No. PCT/JP2019/019311 filed on May 15, 2019, which claims priority under 35 U.S.C § 119(a) to Japanese Patent Application No. 2018-126970 filed on Jul. 3, 2018. Each of the above application(s) is hereby expressly incorporated by reference, in its entirety, into the present application.

BACKGROUND OF THE INVENTION

1. Field of the Invention

A technique of the present disclosure relates to an image correction device, an imaging device, an image correction method, and a non-transitory computer readable recording medium storing an image correction program.

2. Description of the Related Art

In related art, in a case where a user performs imaging of a common imaging target by each of a plurality of imaging devices, moving images obtained by imaging by each imaging device are generally collected into one moving image. For example, WO 2013/161319 A1 describes a technique of collecting and reproducing related moving image contents by selecting contents to be reproduced from among a plurality of moving image contents based on an imaging time and space information related to the moving image contents.

SUMMARY OF THE INVENTION

On the other hand, as described above, in a case where the moving images obtained by imaging by each of the plurality of imaging devices are collected into one moving image, imaging directions of the imaging devices may be different from each other, or models and ages of the imaging devices may be different from each other. In this case, a difference in color between the moving images obtained by imaging by the imaging devices becomes relatively large. As a result, one moving image obtained by collecting the moving images obtained by imaging by the imaging devices may be a moving image without a sense of unity in video.

The present disclosure has been made in consideration of the above circumstances, and an object of the present disclosure is to provide an image correction device, an imaging device, an image correction method, and a non-transitory computer readable recording medium storing an image correction program capable of reducing a difference in color between the moving images obtained by imaging by each of the plurality of imaging devices.

In order to achieve the above object, an image correction device according to a first aspect of the present disclosure comprises: a reception unit that receives a plurality of pieces of moving image data obtained by imaging by each of a plurality of imaging devices and at least one piece of information on an imaging date and time or information on an imaging location corresponding to each of the plurality of pieces of moving image data; a detection unit that detects the same scene between images indicated by the plurality of pieces of moving image data based on the at least one piece of information corresponding to each of the plurality of pieces of moving image data received by the reception unit; and a correction unit that extracts, from each of the images indicated by the plurality of pieces of moving image data corresponding to the same scene detected by the detection unit, a subject which is common between the images and performs, on the corresponding image, color correction of making colors of the extracted subject similar to each other.

A second aspect of the present disclosure provides the image correction device according to the first aspect, in which, in a case where a plurality of the subjects are extracted, the correction unit performs, on all of the plurality of subjects, color correction of making colors of the subject similar to each other as a whole.

A third aspect of the present disclosure provides the image correction device according to the first aspect or the second aspect, in which the correction unit performs the color correction by making saturations of the extracted subject similar to each other in a hue-dependent manner.

A fourth aspect of the present disclosure provides the image correction device according to any one of the first aspect to the third aspect, in which the correction unit calculates a correction amount to be used for the color correction, based on images in which brightness values of the extracted subject are regarded to be the same, among the images indicated by the plurality of pieces of moving image data corresponding to the same scene.

A fifth aspect of the present disclosure provides the image correction device according to the fourth aspect, in which, in a case where a plurality of the subjects are extracted, the correction unit calculates, for each of the subjects, a correction amount to be used for the color correction, based on images in which brightness values of the subject are regarded to be the same.

A sixth aspect of the present disclosure provides the image correction device according to any one of the first aspect to the fifth aspect, in which, after the color correction as first color correction is performed, in a case where second color correction different from the first color correction is further performed on an image indicated by one piece of moving image data among the plurality of pieces of moving image data, the correction unit performs the second color correction on images indicated by the other pieces of moving image data among the plurality of pieces of moving image data.

A seventh aspect of the present disclosure provides the image correction device according to any one of the first aspect to the sixth aspect, in which an upper limit of a correction amount of the color correction is predetermined according to a type of the subject.

An imaging device according to an eighth aspect of the present disclosure comprises: an imaging unit that images a moving image of a subject and outputs moving image data obtained by imaging; a reception unit that receives a plurality of pieces of moving image data, which include moving image data output from the imaging unit and moving image data obtained by imaging by another imaging device, and at least one piece of information on an imaging date and time or information on an imaging location corresponding to each of the plurality of pieces of moving image data; a detection unit that detects the same scene between images indicated by the plurality of pieces of moving image data based on the at least one piece of information corresponding to each of the plurality of pieces of moving image data received by the reception unit; and a correction unit that extracts, from each of the images indicated by the plurality of pieces of moving image data corresponding to the same scene detected by the detection unit, a subject which is common between the images and performs, on the corresponding image, color correction of making colors of the extracted subject similar to each other.

An image correction method according to a ninth aspect of the present disclosure is a method executed by a computer, the method comprising: receiving a plurality of pieces of moving image data obtained by imaging by each of a plurality of imaging devices and at least one piece of information on an imaging date and time or information on an imaging location corresponding to each of the plurality of pieces of moving image data; detecting the same scene between images indicated by the plurality of pieces of moving image data based on the at least one piece of information corresponding to each of the plurality of pieces of moving image data which are received; and extracting, from each of the images indicated by the plurality of pieces of moving image data corresponding to the detected same scene, a subject which is common between the images and performing, on the corresponding image, color correction of making colors of the extracted subject similar to each other.

A non-transitory computer readable recording medium storing an image correction program according to a tenth aspect of the present disclosure is a non-transitory computer readable recording medium storing a program causing a computer to execute a process comprising: receiving a plurality of pieces of moving image data obtained by imaging by each of a plurality of imaging devices and at least one piece of information on an imaging date and time or information on an imaging location corresponding to each of the plurality of pieces of moving image data; detecting the same scene between images indicated by the plurality of pieces of moving image data based on the at least one piece of information corresponding to each of the plurality of pieces of moving image data which are received; and extracting, from each of the images indicated by the plurality of pieces of moving image data corresponding to the detected same scene, a subject which is common between the images and performing, on the corresponding image, color correction of making colors of the extracted subject similar to each other.

Further, in order to achieve the above object, an image correction device according to the present disclosure is an image correction device including a processor, the processor configured to: receive a plurality of pieces of moving image data obtained by imaging by each of a plurality of imaging devices and at least one piece of information on an imaging date and time or information on an imaging location corresponding to each of the plurality of pieces of moving image data; detect the same scene between images indicated by the plurality of pieces of moving image data based on the at least one piece of information corresponding to each of the plurality of pieces of moving image data which are received; extract, from each of the images indicated by the plurality of pieces of moving image data corresponding to the detected same scene, a subject which is common between the images; and perform, on the corresponding image, color correction of making colors of the extracted subject similar to each other.

According to the present disclosure, it is possible to reduce a difference in color between moving images obtained by imaging by each of a plurality of imaging devices.

DESCRIPTION OF THE PREFERRED EMBODIMENTS

Hereinafter, embodiments for implementation of a technique of the present disclosure will be described in detail with reference to the drawings. In the following, an event in which a user obtains a captured image such as a moving image by capturing an imaging target by an imaging device is referred to as imaging. Therefore, "imaging" in a case where a user performs imaging using an imaging device and "capturing" by an imaging device may be interchangeably used in some cases.

First Embodiment

Figure 1:
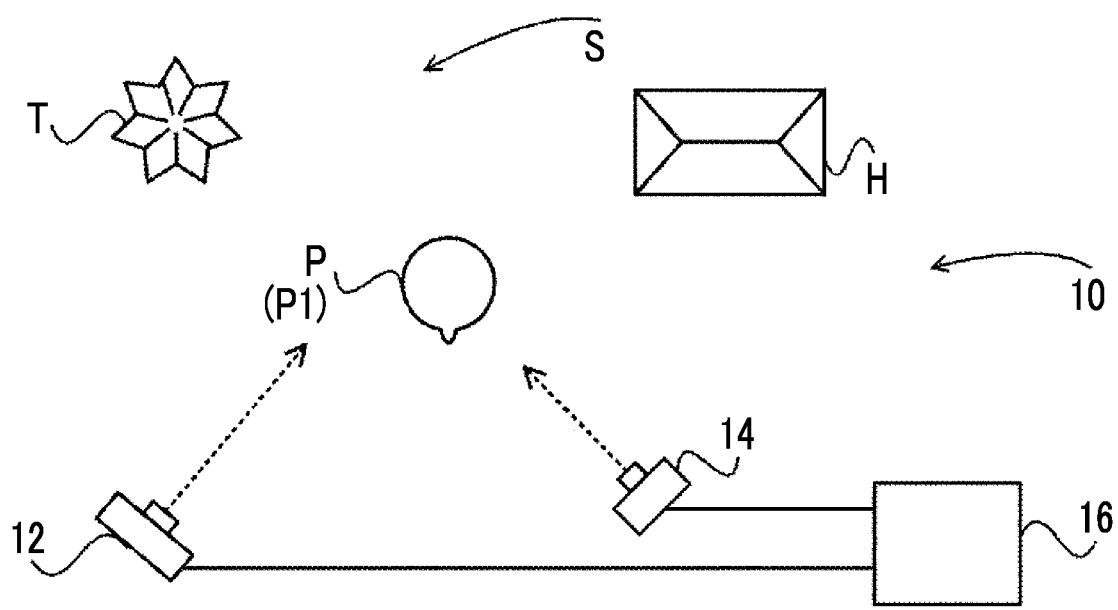
FIG. 1 is a plan view illustrating an example of a configuration of an imaging system according to an embodiment.

First, a configuration of an imaging system 10 according to the present embodiment will be described with reference to FIG. 1. As illustrated in FIG. 1, the imaging system 10 according to the present embodiment includes two imaging devices of a first imaging device 12 and a second imaging device 14, and an image correction device 16. The first imaging device 12 and the second imaging device 14 according to the present embodiment are examples of a plurality of imaging devices of the present disclosure.

In the present embodiment, as an example, a form in which a user generates one moving image, that is, video content by imaging a person P, who is an imaging target, from different directions by the first imaging device 12 and the second imaging device 14, editing moving images obtained by each of the first imaging device 12 and the second imaging device 14, and combining the moving images is described. In imaging of the person P, a person who actually operates each of the first imaging device 12 and the second imaging device 14 may be one person or a plurality of persons, and in the present embodiment, is generically referred to simply as a "user". In the following, a moving image obtained by imaging by the first imaging device 12 is referred to as a "first image", and a moving image obtained by imaging by the second imaging device 14 is referred to as a "second image". Further, each of the "first image" and the "second image" is generically referred to as a "moving image" without distinguishing the images.

Figure 2:
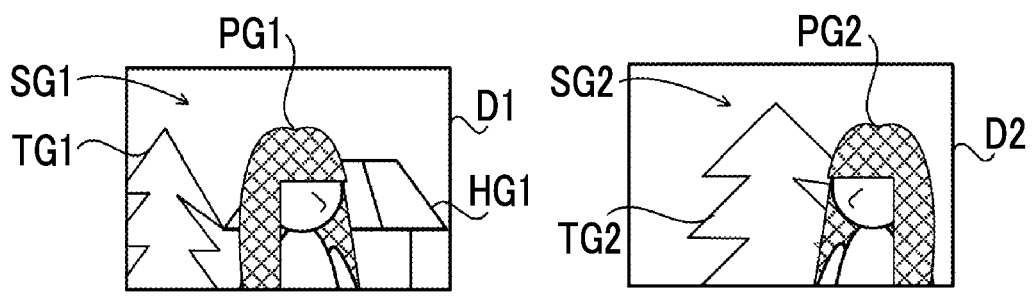
FIG. 2 is an explanatory diagram explaining an example of a first image obtained by imaging by a first imaging device and an example of a second image obtained by imaging by a second imaging device according to the embodiment.

FIG. 2 illustrates an example of the first image D1 obtained by imaging by the first imaging device 12 and the second image D2 obtained by imaging by the second imaging device 14. The first image D1 includes a person image PG1 of the person P, a sky image SG1 of a sky S, a tree image TG1 of a tree T, and a house image HG1 of a house H. In addition, the second image D2 includes a person image PG2 of the person P, a sky image SG1 of the sky S, and a tree image TG2 of the tree T.

In the present embodiment, as an example, a form in which a user generates one moving image by editing the first image D1 and the second image D2 in a time-series order and combining the first image D1 and the second image D2 by connection is described. Specifically, a case where a user combines the first image D1 and the second image D2 in a time-series order, for example, the first image D1 from a start of imaging of the person P to 3 minutes, the second image D2 from 3 minutes to 4 minutes, the first image D1 from 4 minutes to 7 minutes, and the like is described. The method of combining the first image D1 and the second image D2 is not limited to the present embodiment. For example, by dividing one screen into two areas and mapping the first image D1 in the one divided area and the second image D2 in the other divided area, the first image D1 and the second image D2 may be combined. In addition, the first image D1 and the second image D2 may be combined as a form in which one of the first image D1 and the second image D2 is combined with the other image and both images are displayed at the same time.

Each of the first imaging device 12 and the second imaging device 14 is connected to the image correction device 16 by a High-Definition Multimedia Interface (HDMI) (registered trademark) cable. The method for connecting the first imaging device 12 and the second imaging device 14 to the image correction device 16 is not limited to the present embodiment, and may be a form in which other wired connection is used or may be a form in which wireless connection is used. Further, a form in which each of the first imaging device 12 and the second imaging device 14 is connected to the image correction device 16 by different methods may be used. The moving image data representing the moving image obtained by imaging by each of the first imaging device 12 and the second imaging device 14 is output to the image correction device 16.

The image correction device 16 has a function of performing correction of making colors similar to each other in the same scenes in the first image D1 obtained by imaging by the first imaging device 12 and the second image D2 obtained by imaging by the second imaging device 14.

Figure 3:
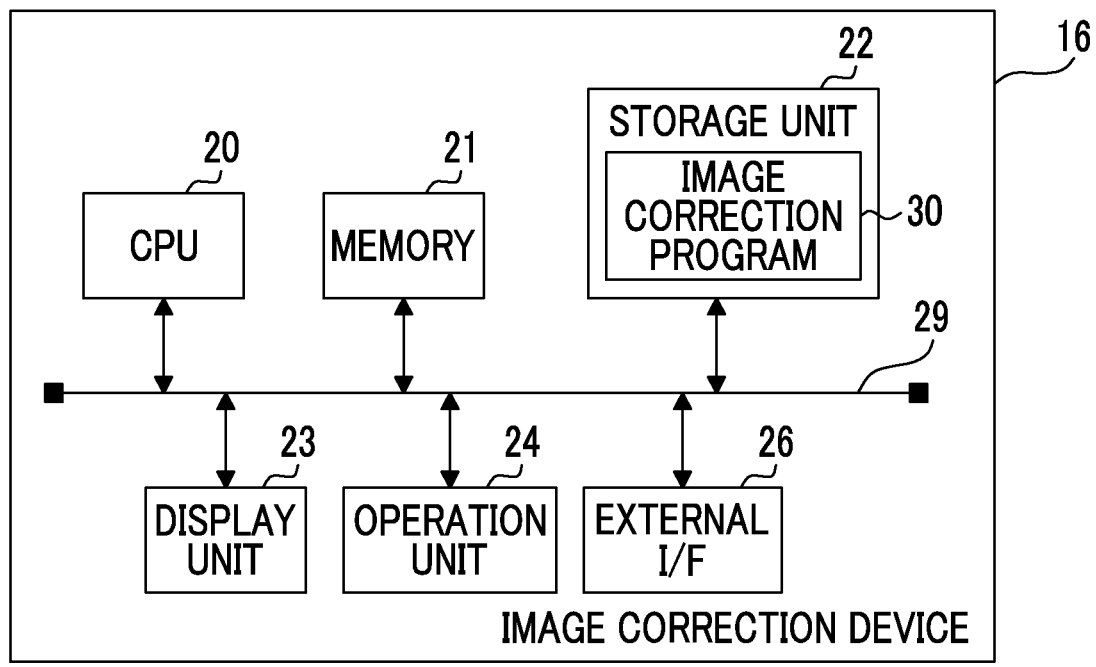
FIG. 3 is a block diagram illustrating an example of a hardware configuration of an image correction device according to the embodiment.

A hardware configuration of the image correction device 16 according to the present embodiment will be described with reference to FIG. 3. As illustrated in FIG. 3, the image correction device 16 according to the present embodiment includes a central processing unit (CPU) 20, a memory 21 as a temporary memory area, and a non-volatile storage unit 22. Further, the image correction device 16 includes a display unit 23 such as a liquid crystal display, and an operation unit 24 including various buttons and the like. The display unit 23 and a part of the operation unit 24 are configured as an integrated touch panel display. Further, the image correction device 16 includes an external I/F 26 to which the first imaging device 12 and the second imaging device 14 are connected. The CPU 20, the memory 21, the storage unit 22, the display unit 23, the operation unit 24, and the external I/F 26 are connected to a bus 29. Examples of the image correction device 16 include a personal computer, a server computer, and the like.

The storage unit 22 is realized by a hard disk drive (HDD), a solid state drive (SSD), a flash memory, or the like. An image correction program 30 is stored in the storage unit 22 as a storage medium. The CPU 20 reads the image correction program 30 from the storage unit 22, develops the read image correction program 30 in the memory 21, and executes the developed image correction program 30.

Figure 4:
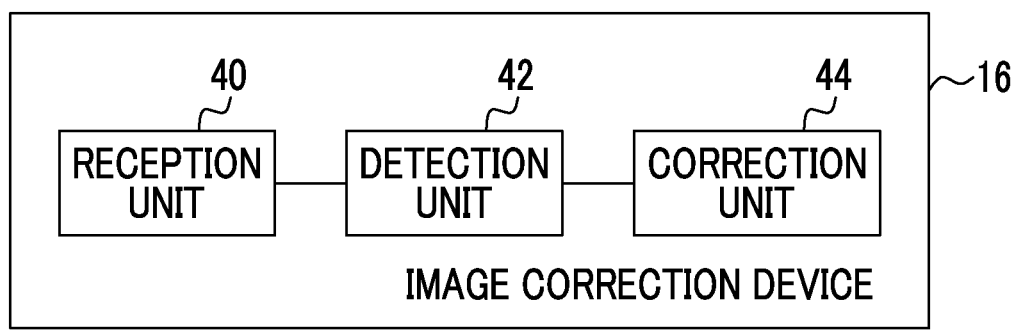
FIG. 4 is a block diagram illustrating an example of a functional configuration of the image correction device according to the embodiment.

Next, a functional configuration of the image correction device 16 according to the present embodiment will be described with reference to FIG. 4. As illustrated in FIG. 4, the image correction device 16 according to the present embodiment includes a reception unit 40, a detection unit 42, and a correction unit 44. The CPU 20 functions as the reception unit 40, the detection unit 42, and the correction unit 44 by executing the image correction program 30.

The reception unit 40 has a function of receiving the first image D1 obtained by imaging by the first imaging device 12, the second image D2 obtained by imaging by the second imaging device 14, and at least one piece of information on an imaging date and time or information on an imaging location corresponding to each of the first image D1 and the second image D2. In the present embodiment, at least one piece of the information on the imaging date and time or the information on the imaging location, which is associated with each moving image, is referred to as an "imaging condition". The "imaging date and time" may be at least one of a year, a month, a day, or a time when the user performs imaging by the first imaging device 12 or the second imaging device 14. The imaging date and time is not limited to a year, a month, a day, or a time, and may be information that can specify a year, a month, a day, or a time. Further, the "imaging location" is not limited to, for example, a specific geographic location obtained by a location detection sensor such as a global positioning system (GPS) sensor, and may be information that can specify an imaging location such as a name of the imaging location.

The detection unit 42 has a function of detecting the same scene between images indicated by the first image D1 and the second image D2 based on information representing the imaging conditions corresponding to each of the first image D1 and the second image D2 received by the reception unit 40.

The correction unit 44 has a function of extracting, from each of the images indicated by the first image D1 and the second image D2 corresponding to the same scene detected by the detection unit 42, a subject which is common between the images, and performing, on the corresponding image, color correction of making colors of the extracted subject similar to each other.

Figure 5:
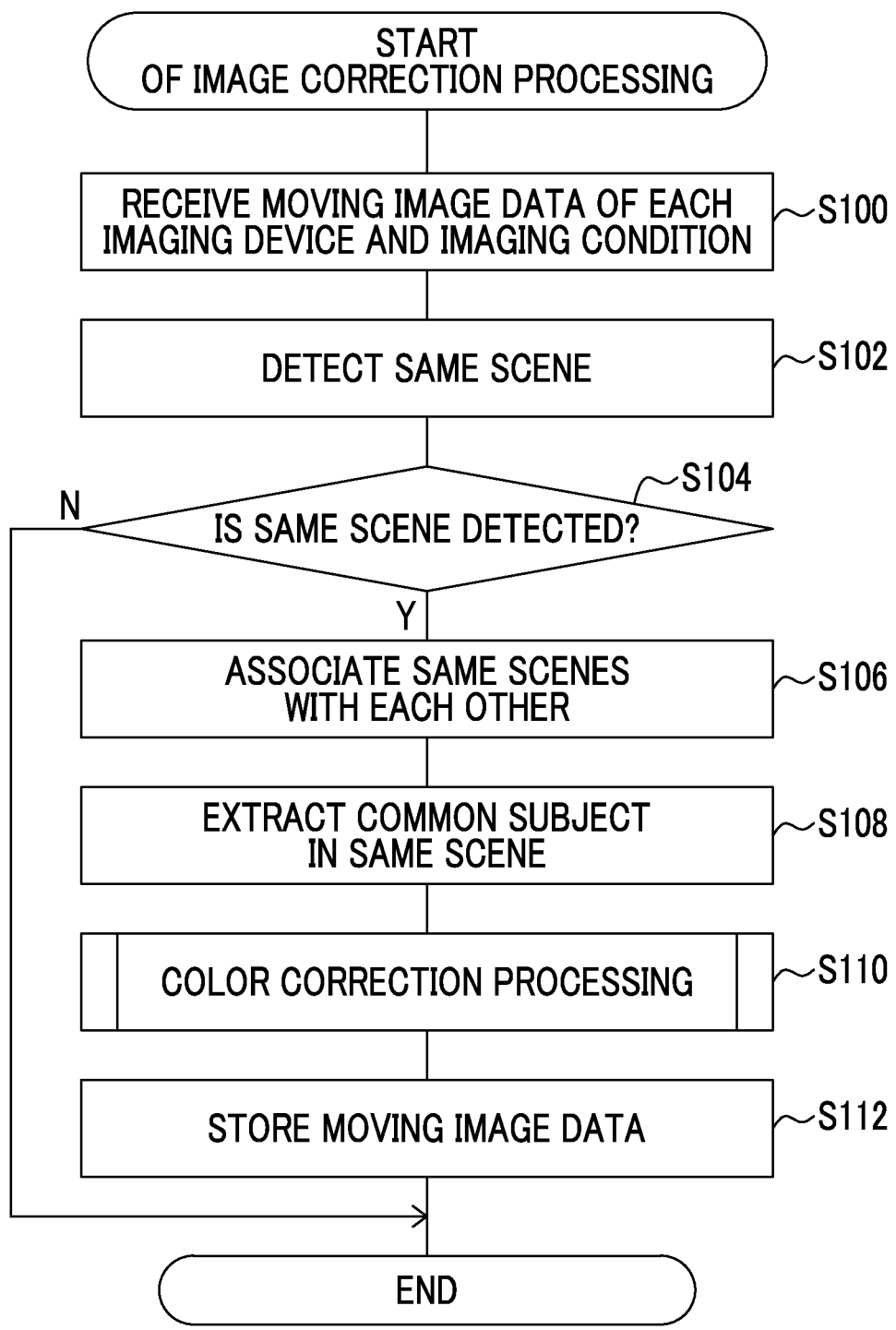
FIG. 5 is a flowchart illustrating an example of a flow of image correction processing executed by the image correction device according to a first embodiment.

Next, an operation of the image correction device 16 according to the present embodiment will be described with reference to FIG. 5. The CPU 20 executes the image correction program 30, and thus image correction processing illustrated in FIG. 5 is executed. The image correction processing illustrated in FIG. 5 is executed, for example, in a case where the first imaging device 12 and the second imaging device 14 are connected to the image correction device 16.

In step S100 of FIG. 5, the reception unit 40 receives moving image data and corresponding imaging conditions from each of the first imaging device 12 and the second imaging device 14. Specifically, the reception unit 40 receives the first image D1 and the imaging condition of the first image D1 from the first imaging device 12, and receives the second image D2 and the imaging condition of the second image D2 from the second imaging device 14. The imaging conditions can be received by, for example, obtaining exchangeable image file format (Exif) information included in metadata of each of the first image D1 and the second image D2.

In the next step S102, the detection unit 42 detects the same scene between the first image D1 and the second image D2 based on the imaging conditions received by the reception unit 40. In the present embodiment, "the same scene" means a scene in which the same imaging target is imaged by the first imaging device 12 and the second imaging device 14, a scene in which the same event is imaged, or a scene which is collected as one video in a case where the user edits the first image D1 and the second image D2. The method of detecting the same scene based on the imaging conditions by the detection unit 42 is not particularly limited. As an example, in the present embodiment, first, the detection unit 42 detects, in each of the first image D1 and the second image D2, the same scene in each moving image, and collects images (frames) included in each moving image for each same scene. For example, the detection unit 42 collects, in each of the first image D1 and the second image D2, images obtained by imaging within a predetermined time as images of the same scene. Further, the detection unit 42 detects, in the first image D1 and the second image D2, among image groups collected as the same scene, image groups in which a difference between the imaging dates and times is within a threshold value and a difference between the imaging locations is within a threshold value, as the same scene.

In detection of the same scene, both of the imaging date and time and the imaging location may be used, or only one of the imaging date and time or the imaging location may be used. Information to be used to detect the same scene is not particularly limited. For example, a form in which information to be used is predetermined may be used, or a form in which information to be used is set by the user may be used. The method of detecting the same scene is not limited to the detection method according to the present embodiment. For example, a form in which information other than the imaging date and time and the imaging location is used may be used, or a form in which information indicating the same scene input by the user during imaging is detected may be used.

In the next step S104, the detection unit 42 determines whether or not the same scene is detected between the first image D1 and the second image D2. In a case where the same scene is not detected, a determination result in step S104 is No, and the image correction processing is ended. On the other hand, in a case where the same scene is detected, a determination result in step S104 is Yes, and the process proceeds to step S106.

In step S106, the detection unit 42 associates the detected same scenes between the first image D1 and the second image D2 with each other. The method in which the detection unit 42 associates the same scenes with each other is not particularly limited. For example, a form in which the same identifier may be given to each scene may be used.

In the next step S108, the correction unit 44 extracts, for each same scene between the first image D1 and the second image D2, a subject (hereinafter, referred to as a "common subject") commonly included in each image. For example, in a case of the first image D1 and the second image D2 illustrated in FIG. 2, the first image D1 includes a person image PG1, a sky image SG1, and a tree image TG1, and the second image D2 includes a person image PG2, a sky image SG2, and a tree image TG2. Thus, the subjects commonly included in both images are a face P1 of the person P, the sky S, and the tree T. In this case, the correction unit 44 extracts at least one of the person P, the sky S, or the tree T as a common subject. The number of the common subjects extracted by the correction unit 44 may be one, or may be plural. A form in which the number of the common subjects is predetermined may be used, or a form in which the number of the common subjects is set by the user may be used. In addition, in a case where the number of the common subjects to be extracted is plural, from a viewpoint of preventing complication of processing, an upper limit value may be set. Further, a form in which a specific subject such as the set person P is extracted as a common subject according to an instruction and a setting from a user or the like may be used.

The method in which the correction unit 44 extracts a common subject from the images is not particularly limited, and a method according to each subject may be applied. For example, in a case where the face P1 of the person P is a common subject, an existing face detection technique and a face recognition technique may be applied to the images, and thus the face of the same person may be extracted as a common subject. In addition, for example, in a case where an object such as a tree T or a house H is a common subject, the same object may be extracted as a common subject by applying, to the images, an existing object recognition technique of performing determination based on colors, resolution, contrast, angle of view, and the like. In addition, for example, in a case where the sky S is a common subject, an existing technique of performing determination based on regions (as a specific example, upper regions) in the images, colors, and the like, or an existing technique of detecting the horizon and performing determination based on the horizon as a reference position may be applied, and thus a subject such as a sky may be extracted as a common subject.

Figure 6:
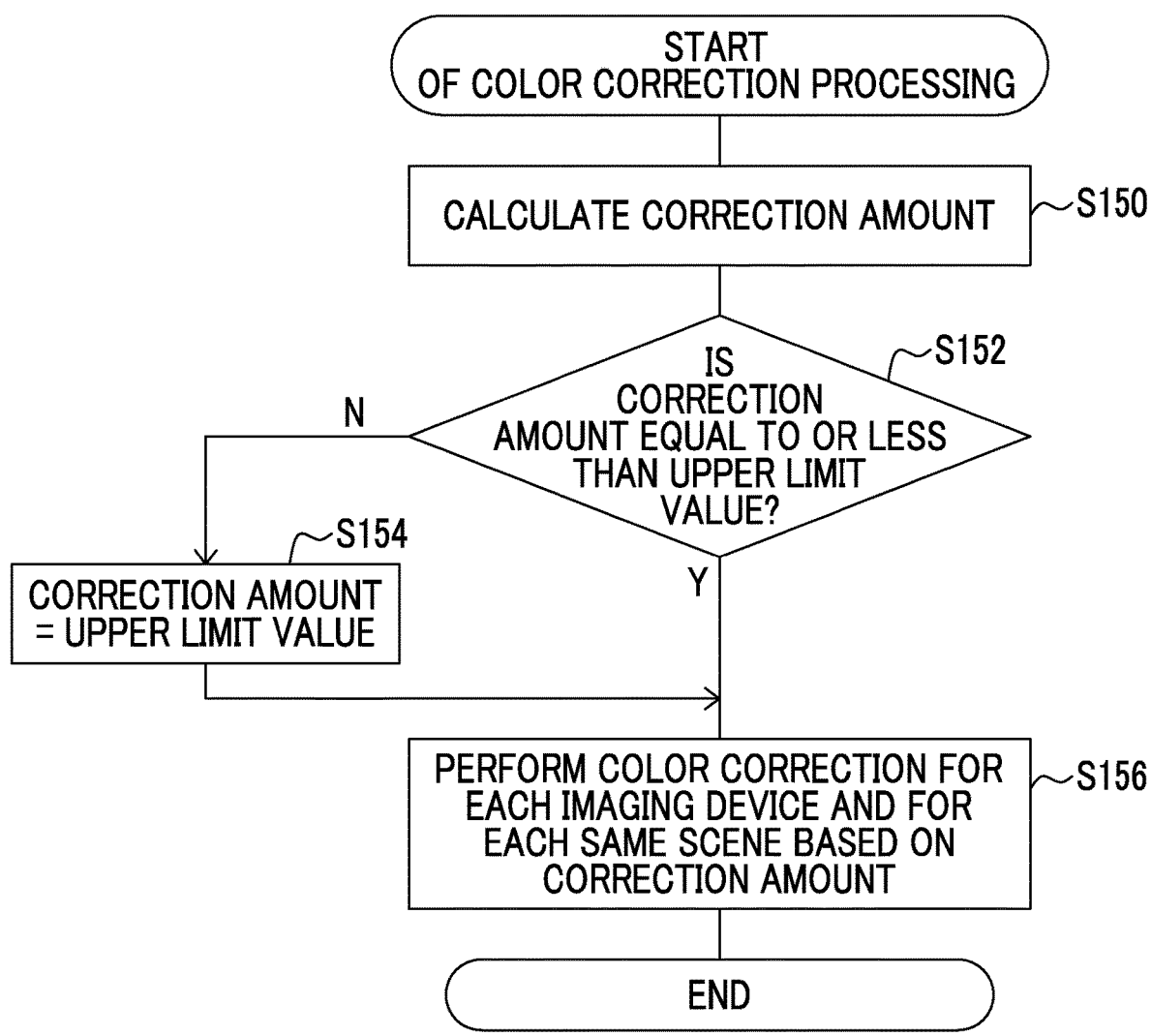
FIG. 6 is a flowchart illustrating an example of a flow of color correction processing executed by the image correction device according to the first embodiment.

In the next step S110, the correction unit 44 corrects a color of the common subject in the same scene between the first image D1 and the second image D2 by performing color correction processing of which an example is illustrated in FIG. 6. In the color correction processing of which an example is illustrated in FIG. 6, an image of one same scene between the first image D1 and the second image D2 is a correction target. The color correction processing is repeated for each of the same scenes detected by the detection unit 42, that is, by the number corresponding to the same scenes. In addition, as an example, in the present embodiment, the first imaging device 12 is a main camera that is mainly used to capture an imaging target by the user, and the second imaging device 14 is a sub camera. A form in which the color of the second image D2 obtained by the second imaging device 14 is made similar to the color of the first image D1 obtained by the first imaging device 12 will be described.

In step S150 of FIG. 6, the correction unit 44 calculates a correction amount. The method of calculating the correction amount is not particularly limited. For example, the following calculation method may be used.

First, an example of a method of calculating a correction amount in a case where the number of the extracted common subjects is one (single) will be described. For example, in a case where the common subject is the face P1 of the person P, the correction unit 44 performs color correction of making the color of the person image PG1, which is included in the image of the first image D1, and the color of the person image PG2, which is included in the image of the second image D2, similar to each other such that a difference in color is within a threshold value, more preferably, the colors are the same. As an example, in the present embodiment, correction of adjusting the color of the person image PG2 to the color of the person image PG1 is performed. The correction unit 44 performs processing of making the color of the person image PG2 similar to the color of the person image PG1 by shifting the color of the person image PG2 by adjustment of white balance of the person image PG2, and processing of making the saturation of the person image PG2 similar to the saturation of the person image PG1 by adjusting a gain (magnification) of the saturation. Therefore, the correction unit 44 calculates, as a correction amount, a shift amount of the color and a magnification of the saturation.

Figure 7:
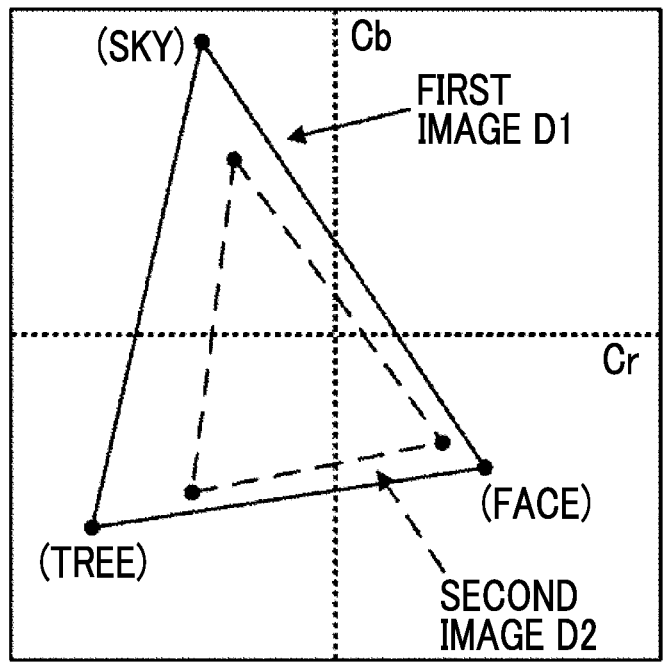
FIG. 7 is a graph explaining an example of saturation correction according to a common subject.

Next, an example of a method of calculating a correction amount in a case where there are a plurality of extracted common subjects will be described. For example, in a case where the common subjects are the face P1 of the person P, the sky S, and the tree T, the correction unit 44 performs color correction of making the color of the person image PG1, which is included in the image of the first image D1, and the color of the person image PG2, which is included in the image of the second image D2, similar to each other such that a difference in color is within a threshold value, more preferably, the colors are the same. Further, the correction unit 44 performs color correction of making the color of the sky image SG1, which is included in the image of the first image D1, and the color of the sky image SG2, which is included in the image of the second image D2, similar to each other such that a difference in color is within a threshold value, more preferably, the colors are the same. Further, the correction unit 44 performs color correction of making the color of the tree image TG1, which is included in the image of the first image D1, and the color of the tree image TG2, which is included in the image of the second image D2, similar to each other such that a difference in color is within a threshold value, more preferably, the colors are the same. As an example, as illustrated in FIG. 7, it is assumed that the person image PG1, the sky image SG1, and the tree image TG1 in the first image D1 and the person image PG2, the sky image SG2, and the tree image TG2 in the second image D2 have different colors (saturations). In the graph illustrated in FIG. 7, as a distance from the center is increased, the saturation becomes higher, and as a whole, the second image D2 has a lower saturation than the first image D1.

Figure 8:
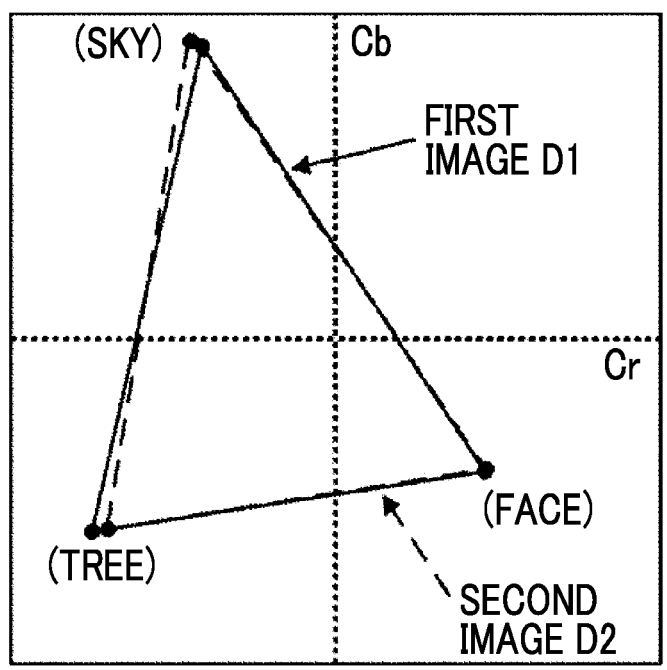
FIG. 8 is a graph explaining an example of saturation correction according to a common subject.

In the example illustrated in FIG. 7, since the saturation of the second image D2 is lower than the saturation of the first image D1 as described above, correction of making the saturation of the second image D2 higher in accordance with the saturation of the first image D1 is performed. FIG. 8 illustrates an example in which the saturation of the second image D2 is corrected with reference to the face P1 of the person P as the common subject. In the form illustrated in FIG. 8, the correction unit 44 calculates a correction amount (magnification) for matching the saturation of the person image PG2 with the saturation of the person image PG1, and also corrects the saturation of another common subject based on the calculated correction amount.

In the example illustrated in FIG. 8, since the saturation of the person image PG1 and the saturation of the person image PG2 are matched with each other as described above, the saturation of the sky image SG1 and the saturation of the sky image SG2 are similar to each other but are not matched with each other. On the other hand, the saturation of the tree image TG1 and the saturation of the tree image TG2 are similar to each other but are not matched with each other. As described above, in a case where there are a plurality of common subjects, in a state where a saturation of a single common subject is set as a reference, saturations of other common subjects may not necessarily be matched with the saturation of the single common subject. In this case, there is no problem as long as a difference in chromaticity is within a predetermined range. In a case where a difference in chromaticity is not within a predetermined range, for example, the common subject as a reference may be changed. In addition, for example, a saturation of a common subject may not be set as a reference, and saturations of all the common subjects may be corrected such that a difference in chromaticity is within a predetermined range. In the examples illustrated in FIG. 7 and FIG. 8, only correction of the saturation is described. On the other hand, instead of the saturation, or together with the saturation, a shift amount of the color (white balance) may be corrected, as in the case of the single common subject described above. In this way, in a case of a form in which the correction amount is calculated using the plurality of common subjects, accuracy of color adjustment can be improved as compared with a form in which the correction amount is calculated using a single common subject.

Figure 9:
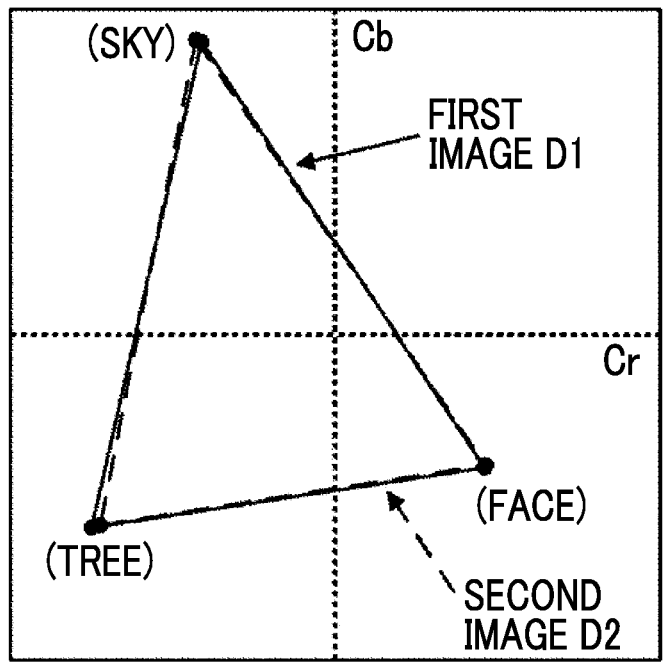
FIG. 9 is a graph explaining an example of saturation correction according to a common subject.

Further, another example of a method of calculating a correction amount in a case where there are a plurality of extracted common subjects will be described. As described above, it is assumed that the common subjects are the face P1 of the person P, the sky S, and the tree T, and that the first image D1 and the second image D2 have a relationship illustrated in FIG. 8. First, the correction unit 44 calculates correction amounts for making saturations of the face P1 of the person P, the sky S, and the tree T, which are common subjects, similar to each other. Therefore, in some cases, the correction amount for making the saturation of the person image PG2 similar to the saturation of the person image PG1, the correction amount for making the saturation of the sky image SG2 similar to the saturation of the sky image SG1, and the correction amount for making the saturation of the tree image TG2 similar to the saturation of the tree image TG1 may be different from each other. FIG. 9 illustrates an example of a case where the correction amount is calculated for each common subject and the saturation of the second image D2 is corrected. It can be seen that a form illustrated in FIG. 9 has a smaller difference in saturation for all the common subjects than a form illustrated in FIG. 8.

Figure 10:
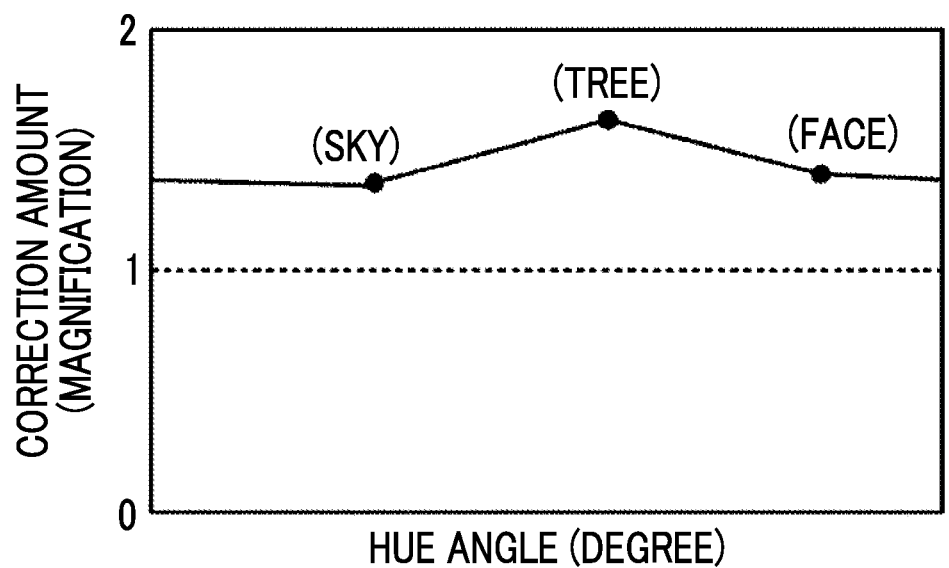
FIG. 10 is a graph explaining an example of a relationship between a hue angle and a correction amount.

In a case of the form, the correction unit 44 further calculates a correction amount for each hue (hue angle) based on the correction amount calculated for each common subject. FIG. 10 is a graph illustrating an example of a relationship between the hue angle and the correction amount (magnification) of the saturation in the second image D2. In the hue angle on the horizontal axis of the graph illustrated in FIG. 10, the hue angle is set to 0 degrees in a case where the color is on the Cr axis and Cb=0 in FIG. 9. Further, a case where the correction amount is 1 (magnification) indicates that the correction does not need to be performed. As illustrated in FIG. 10, the correction unit 44 performs interpolation so as to smoothly connect correction amounts for the face P1 of the person P, the sky S, and the tree T which are common subjects, and calculates a correction amount according to the hue angle. In the examples illustrated in FIG. 9 and FIG. 10, only correction of the saturation is described. On the other hand, instead of the saturation, or together with the saturation, a shift amount of the color (white balance) may be corrected, as in the case of the single common subject described above. As described above, in a case where the correction amount is calculated for each of the plurality of common subjects and correction is performed for each hue, it is possible to make the colors of all the images similar to each other as compared with a case where correction is performed for all hues based on a single correction amount.

In a case where the correction unit 44 calculates a correction amount in this way, in the next step S152, the correction unit 44 determines whether or not the calculated correction amount is equal to or less than a predetermined upper limit value. The determination is preferably performed for each common subject in a case where a plurality of common subjects are detected, and upper limit values may be set according to types of the common subjects such as a person, an object, and a background. In a case where the correction amount exceeds the upper limit value, a determination result in step S152 is No, and the process proceeds to step S154. In step S154, the correction unit 44 sets the correction amount to the upper limit value instead of the calculated correction amount, and then the process proceeds to step S156.

On the other hand, in a case where the correction amount is equal to or less than the upper limit value, a determination result in step S152 is Yes, and the process proceeds to step S156. In step S156, the correction unit 44 performs color correction on each image included in the same scene for each imaging device and for each same scene, based on the correction amount, and then ends the color correction processing. In a case where the color correction processing is ended in this way, the process proceeds to step S112 of the image correction processing (refer to FIG. 5).

In step S112, the correction unit 44 stores the color-corrected first image D1 and the color-corrected second image D2 in the storage unit 22, and then ends the image correction processing. According to a request of the user, the color-corrected first image D1 and the color-corrected second image D2 may be displayed on the display unit 23, or may be output to an external device via the external I/F 26.

Second Embodiment

Hereinafter, a second embodiment will be described in detail. In the present embodiment, the same components and operations as those described in the first embodiment are denoted by the same reference numerals, and a detailed description thereof will be omitted.

The configurations of the imaging system 10 and the image correction device 16 according to the present embodiment are similar to the configurations of the imaging system 10 and the image correction device 16 according to the first embodiment (refer to FIGS. 1, 3, and 4), and thus a description thereof will be omitted.

On the other hand, an operation of the image correction device 16 according to the present embodiment is different in a part of the color correction processing executed in the image correction processing. As described above, the detection unit 42 detects the same scenes between the first image D1 and the second image D2, and associates the same scenes with each other. Here, in some cases, brightness values (exposure) of images of the image group that are regarded to be the same scene in the first image D1 may be different. Similarly, in some cases, brightness values of images of the image group that are regarded to be the same scene in the second image D2 may be different. For example, in an example illustrated in FIG. 11, the first image D1 and the second image D2, which are associated with the same scene by the detection unit 42, respectively include three images (frames). The first image D1 includes an image F11, an image F12, and an image F13. The brightness value of the image F12 is higher than the brightness value of the image F11, and the brightness value of the image F13 is lower than the brightness value of the image F11. Further, the second image D2 includes an image F21, an image F22, and an image F23. The brightness value of the image F23 is higher than the brightness value of the image F22, and the brightness value of the image F21 is lower than the brightness value of the image F22. In the example illustrated in FIG. 11, the image F 11 of the first image D1 and the image F22 of the second image D2, the image F12 of the first image D1 and the image F23 of the second image D2, and the image F13 of the first image D1 and the image F21 of the second image D2 are combinations in which the brightness values are similar to each other (for example, a difference in brightness value is within a predetermined threshold value).

In this way, in a case where brightness (brightness value) of the image is different, the saturation of the same subject varies. For example, as in the image F13 and image F21, in a case where the brightness value is relatively low and the image has a dark and blackish color, the saturation decreases. On the other hand, as in the image F12 and the image F23, in a case where the brightness value is relatively high and the image has a bright and whitish color, the saturation increases. That is, even in a case of the same imaging device, the same scene, and the same subject, the saturation may be different in some cases.

Therefore, in color correction according to the present embodiment, by performing, on the first image D1 and the second image D2, correction of making the colors of the common subjects extracted from the images having similar brightness values similar to each other, an influence of a difference in saturation due to a difference in brightness value as described above is reduced.

Figure 12:
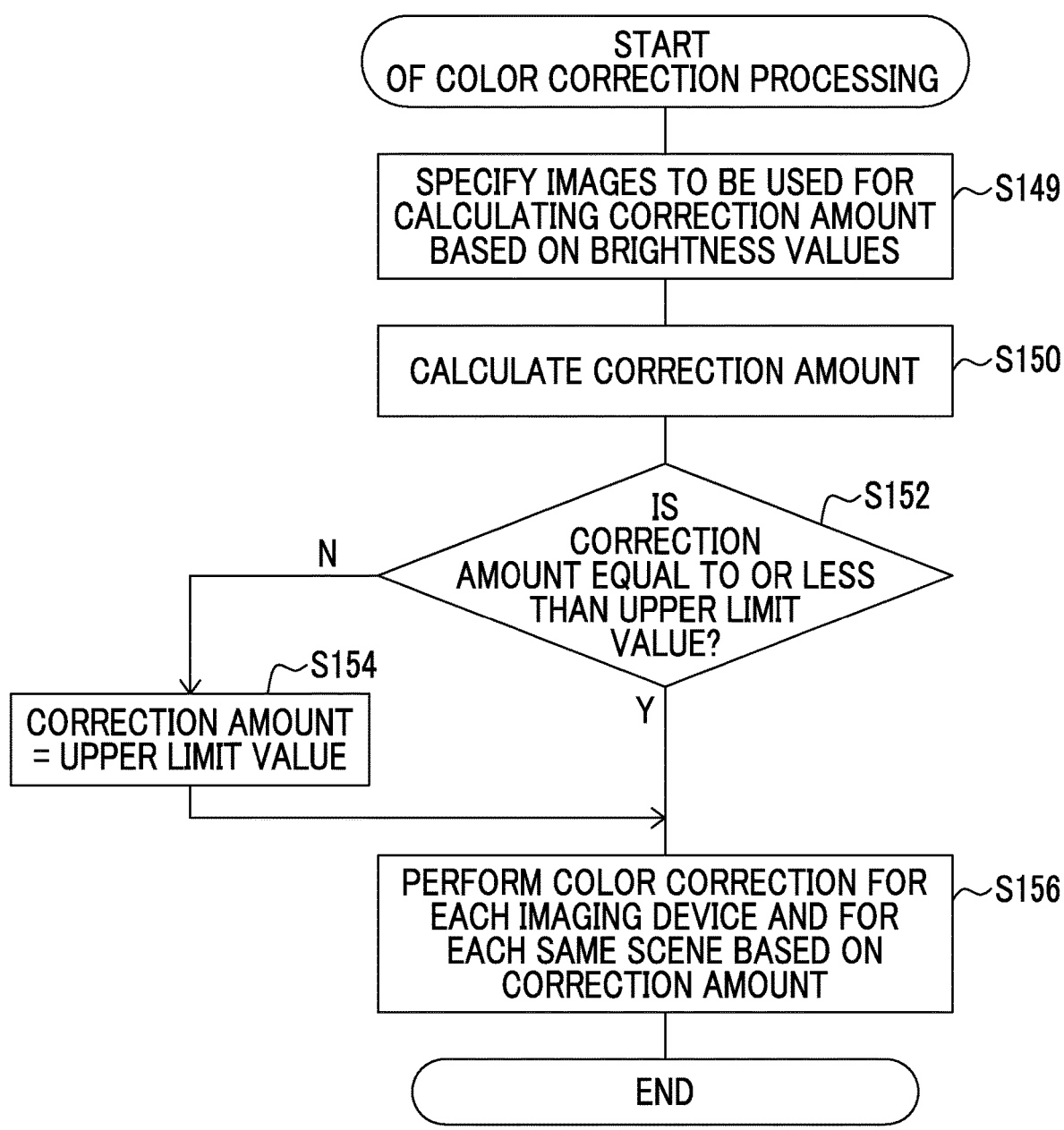
FIG. 12 is a flowchart illustrating another example of a flow of color correction processing according to the second embodiment.

FIG. 12 illustrates a flowchart illustrating an example of a flow of color correction processing according to the present embodiment. As illustrated in FIG. 12, the color correction processing according to the present embodiment is different in that processing of step S149 is performed before step S150 of the color correction processing according to the first embodiment (refer to FIG. 6) and immediately after the color correction processing is started.

In step S149, the correction unit 44 specifies each image to be used for calculating the correction amount from the first image D1 and the second image D2 based on the brightness value of each image. As described above, in a case of the example illustrated in FIG. 11, the correction unit 44 specifies any one of the image F11 of the first image D1 and the image F22 of the second image D2, the image F12 of the first image D1 and the image F23 of the second image D2, or the image F13 of the first image D1 and the image F21 of the second image D2. In a case where color correction is performed, preferably, the brightness value of the image is not too high (not over high), and the brightness value of the image is not too low (not under low). Therefore, as an example, in the present embodiment, a brightness value range, which is to be applied to the images used for calculating the correction amount, is predetermined, and the correction unit 44 specifies a combination of images, which are within the predetermined range and have a small difference in brightness value, as the images to be used for calculating the correction amount. In a case where a plurality of common subjects are extracted, the correction unit 44 may specify the images to be used for calculating the correction amount for each common subject.

Figure 11:
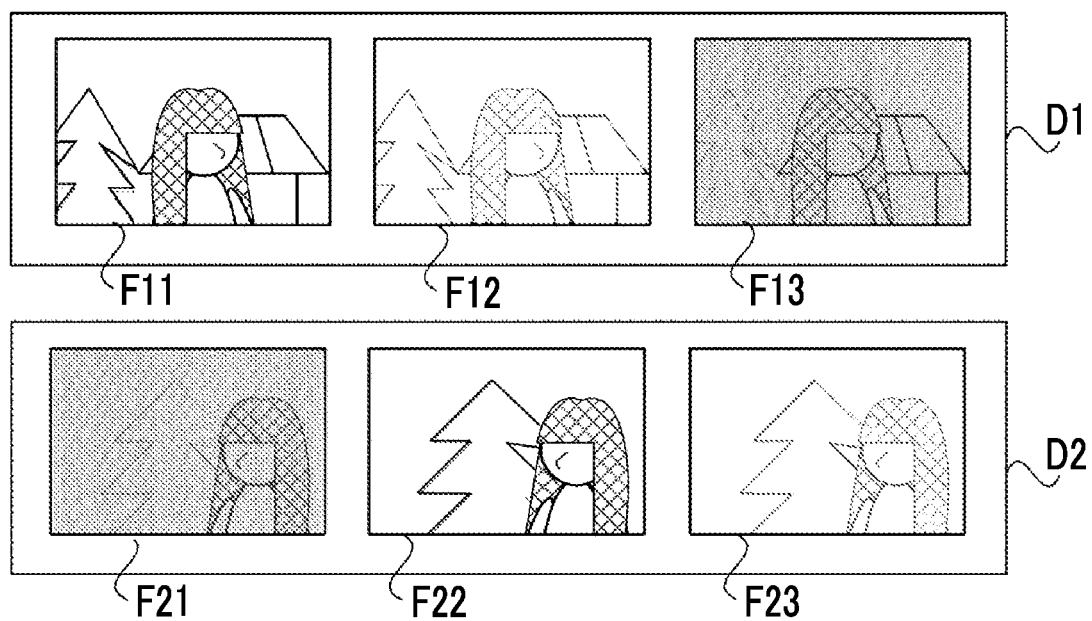
FIG. 11 is an explanatory diagram explaining an example of a first image and a second image according to a second embodiment.

For example, in a case of the example illustrated in FIG. 11, the image F11 of the first image D1 and the image F22 of the second image D2 may be specified for the face P1 of the person P, the image F12 of the first image D1 and the image F23 of the second image D2 may be specified for the sky S, and the image F13 of the first image D1 and the image F21 of the second image D2 may be specified for the tree T.

In this way, by specifying the images to be used for calculating the correction amount, in the subsequent step S150, the correction amount is calculated from the specified images as described above.

As described above, in the image correction device 16 according to the present embodiment, the correction amount to be used for color correction is calculated from the images having relatively similar brightness values, and thus the color correction can be performed with higher accuracy.

Third Embodiment

Hereinafter, a third embodiment will be described in detail. In the present embodiment, the same components and operations as those described in the first embodiment and the second embodiment are denoted by the same reference numerals, and a detailed description thereof will be omitted.

The configurations of the imaging system 10 and the image correction device 16 according to the present embodiment are similar to the configurations of the imaging system 10 and the image correction device 16 according to the first embodiment (refer to FIGS. 1, 3, and 4), and thus a description thereof will be omitted.

On the other hand, an operation of the image correction device 16 according to the present embodiment is different in a part of the image correction processing. In the first embodiment and the second embodiment, as color correction performed by the image correction device 16 in the image correction processing, a case where color correction for making the colors of the same scenes between the first image D1 and the second image D2 similar to each other is automatically performed is described. In the present embodiment, a form in which the user further performs color correction as so-called post production will be described.

Figure 13:
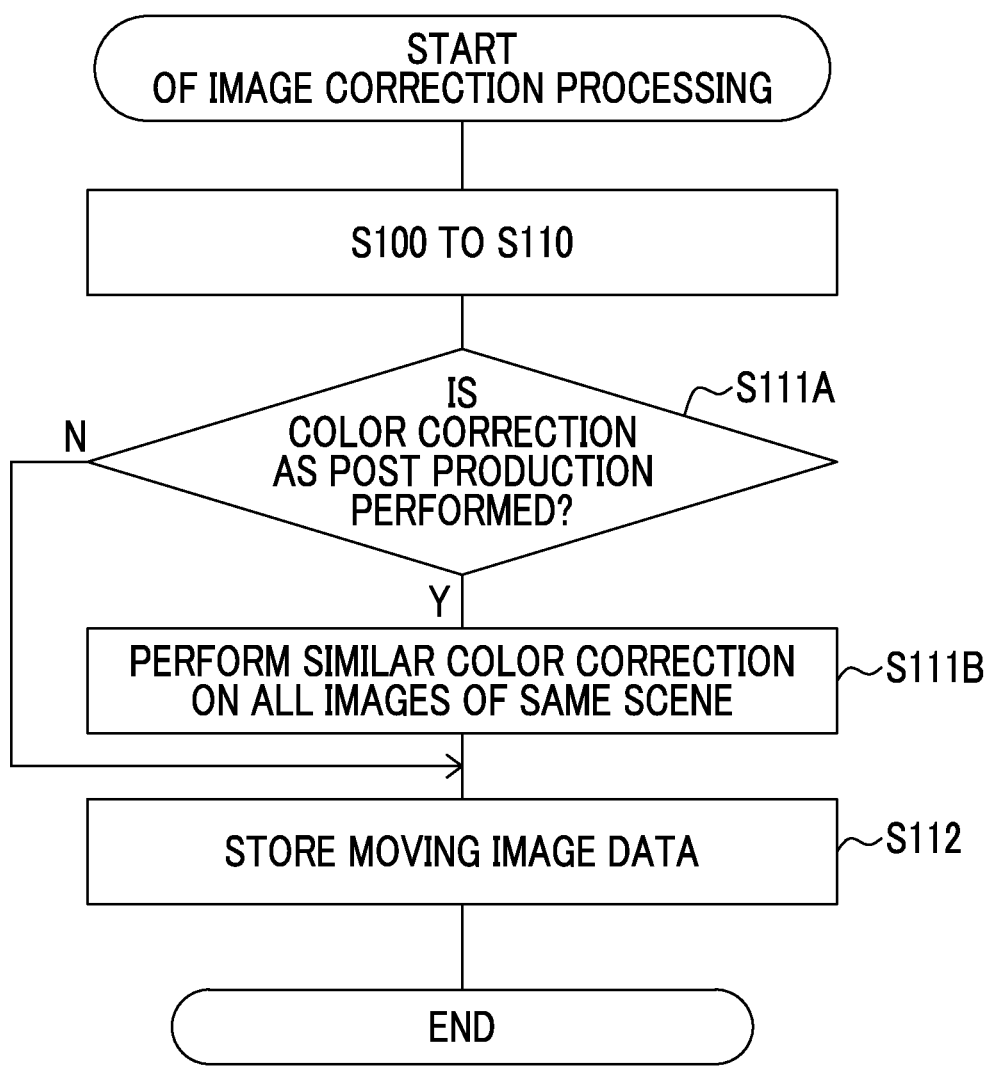
FIG. 13 is a flowchart illustrating another example of a flow of image correction processing according to a third embodiment.

FIG. 13 illustrates a flowchart illustrating an example of a flow of image correction processing according to the present embodiment. As illustrated in FIG. 13, the image correction processing according to the present embodiment is different in that processing of step S111A and processing of step S111B are executed between step S110 and step S112 of the image correction processing (refer to FIG. 5) according to the first embodiment.

In the present embodiment, as described above, after the color correction processing is ended in step S110, the process proceeds to step S111A. In step S111A, the correction unit 44 determines whether or not the user performs color correction as post production, that is, whether or not the user performs color correction by the operation unit 24 by referring to at least one of the first image D1 or the second image D2 displayed on the display unit 23. The color correction performed in step S110 of the present embodiment is an example of first color correction according to the present disclosure, and the color correction performed as post production by the user in the present embodiment is an example of second color correction according to the present disclosure.

Figure 14:
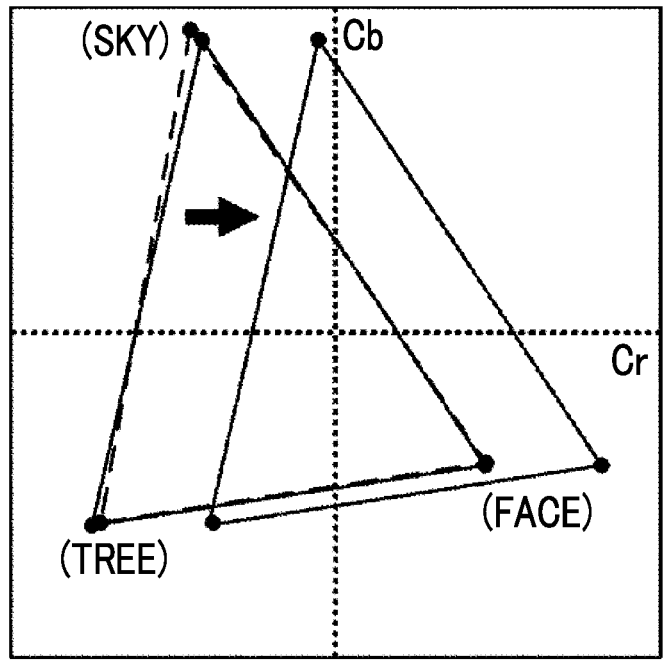
FIG. 14 is a graph explaining an example of color correction by a user.

After processing of step S110 is ended, in the present embodiment, as an example, in a case where the user does not operate the operation unit 24 even after a predetermined period has elapsed, or in a case where the user instructs to end the image correction processing via the operation unit 24, a determination result in step S111A is No, and the process proceeds to step S112. On the other hand, in a case where the user performs the color correction using the operation unit 24, a determination result in step S111A is Yes, and the process proceeds to step S111B. FIG. 14 illustrates an example of color correction performed as post production by the user. The example illustrated in FIG. 14 illustrates a state where the saturation of the entire image of the first image D1 is corrected. In other words, a case where the saturation of the image of the first image D1 is overall shifted is illustrated.

Figure 15:
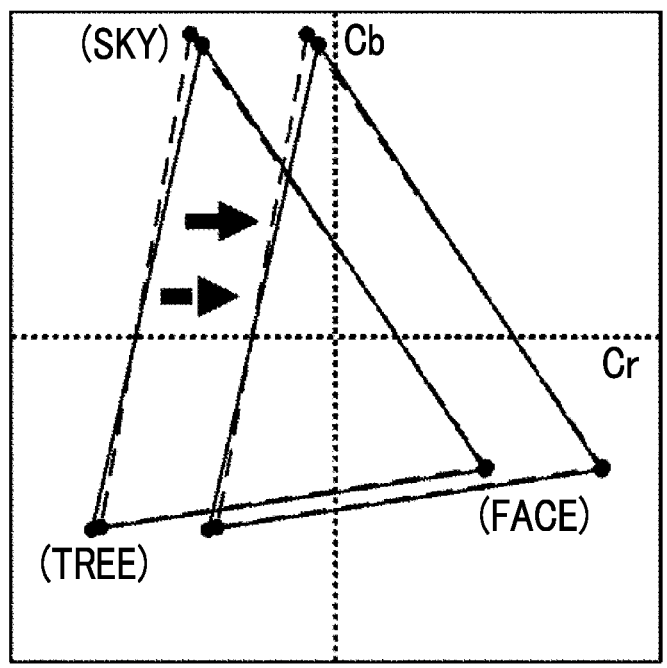
FIG. 15 is a graph explaining color correction according to the third embodiment.

In the next step S111B, the correction unit 44 performs similar color correction on all the images of the same scene as the image on which the color correction is performed by the user. As a specific example, in a case where the user performs the color correction (saturation shift) illustrated in FIG. 14 on one image of the first images D1, the correction unit 44 similarly performs saturation shift as color correction, on the first image D1 of the same scene as the image on which the color correction is performed. Further, as in the example illustrated in FIG. 15, saturation shift as color correction is similarly performed on all the images of the second image D2 associated with the same scene as the first image D1 on which the saturation shift is performed.

In this way, the image correction device 16 according to the present embodiment automatically performs color correction in which post production of color correction by the user is reflected, in addition to color correction of reducing a difference between the first image D1 and the second image D2, that is, a difference between the first imaging device 12 and the second imaging device 14. Therefore, according to the image correction device 16 of the present embodiment, the user does not need to perform the color correction on both of the first image D1 and the second image D2, and thus it is possible to reduce labor of the user.

As described above, the image correction device 16 according to the present embodiment includes the reception unit 40, the detection unit 42, and the correction unit 44. The reception unit 40 receives the first image D1 and the second image D2, which are obtained by imaging by the first imaging device 12 and the second imaging device 14, and the imaging condition that is at least one piece of information on an imaging date and time or information on an imaging location corresponding to each of the first image D1 and the second image D2. The detection unit 42 detects the same scene between images indicated by the first image D1 and the second image D2 based on the imaging conditions corresponding to each of the first image D1 and the second image D2 received by the reception unit 40. The correction unit 44 extracts, from each of the images indicated by the first image D1 and the second image D2 corresponding to the same scene detected by the detection unit 42, a common subject which is common between the images, and performs, on the corresponding image, color correction of making colors of the extracted common subject similar to each other.

With such a configuration, according to the image correction device 16 of the present embodiment, it is possible to reduce a difference in color between moving images obtained by imaging by each of the plurality of imaging devices. Therefore, in a case where the first image D1 and the second image D2 of the same scene are combined and edited into one moving image, a natural moving image with a sense of unity can be obtained. Further, since the image correction device 16 automatically performs color correction for each same scene without a request of post production by the user, labor of the user can be reduced, and a user who is unfamiliar with imaging can easily edit a moving image with a sense of unity.

In the embodiments, the form in which the color of the second image D2 is matched with the color of the first image D1 has been described. On the other hand, the present disclosure is not limited to the embodiments. For example, a form in which the color of the first image D1 is matched with the color of the second image D2 may be used, or a form in which the color of the first image D1 and the color of the second image D2 are matched with a predetermined color such as a color desired by the user may be used. In addition, in a case where a plurality of common subjects are extracted, a color for matching may be set for each common subject.

In the embodiments, the form in which the imaging devices used by the user for imaging the imaging target are two imaging devices of the first imaging device 12 and the second imaging device 14 has been described. On the other hand, the number of the imaging devices used for imaging is not limited.

Figure 16:
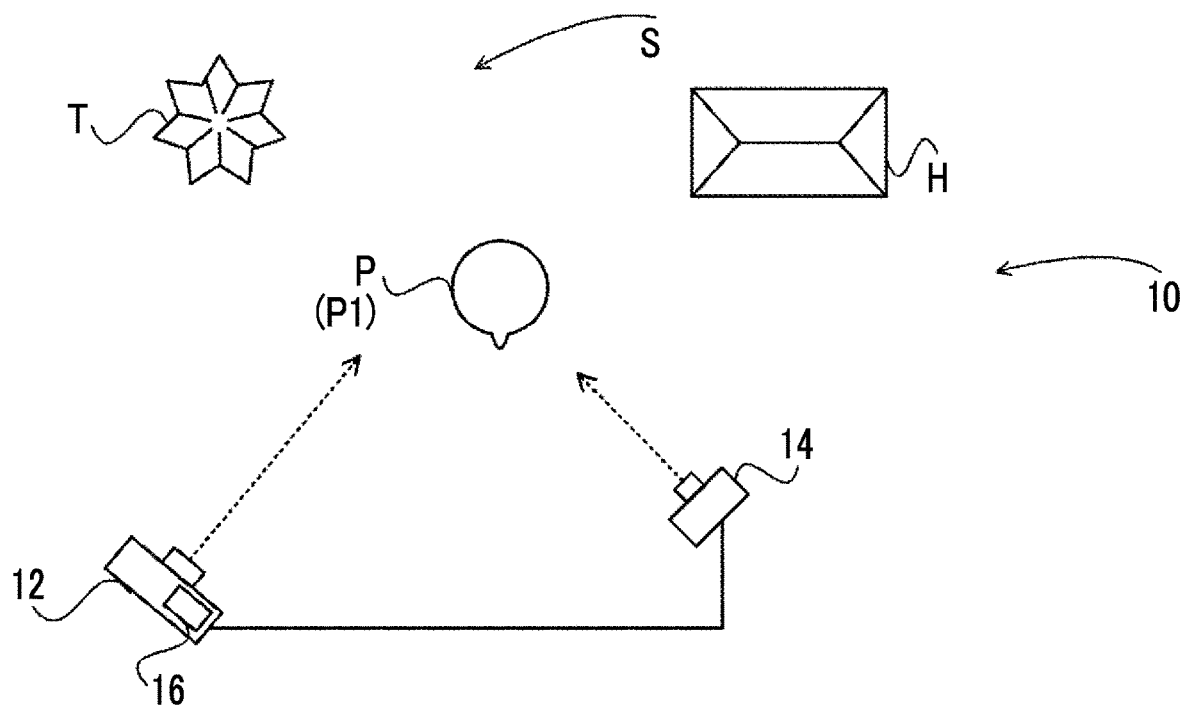
FIG. 16 is a plan view illustrating another example of a configuration of an imaging system according to the embodiment.
Figure 17:
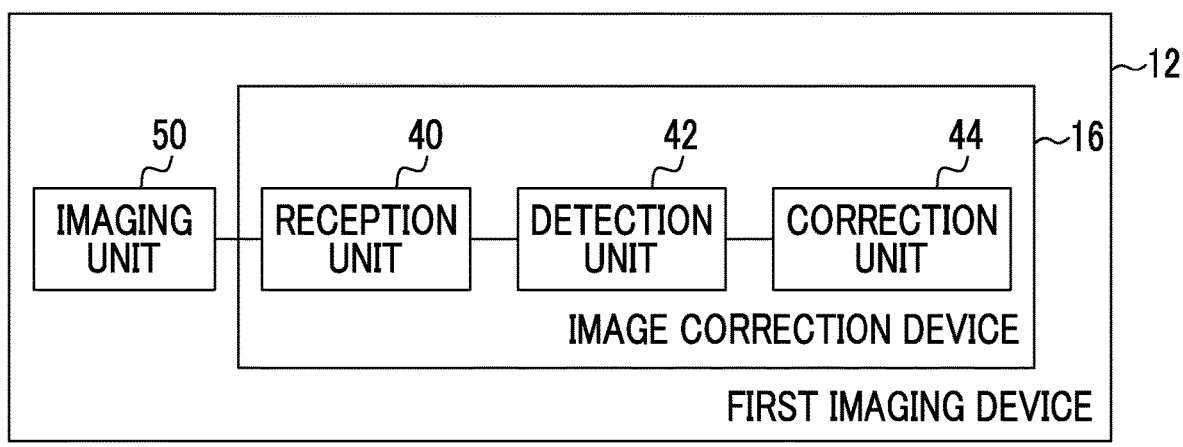
FIG. 17 is a block diagram illustrating an example of a functional configuration of a first imaging device illustrated in FIG. 16.

Further, in the embodiments, the form in which the imaging system 10 includes the imaging devices (the first imaging device 12 and the second imaging device 14) and the image correction device 16 as separate devices has been described. On the other hand, the present disclosure is not limited to the form. For example, one of the imaging devices may have the function of the image correction device 16. FIG. 16 illustrates an example of a configuration of the imaging system 10 in this case. The imaging system 10 illustrated in FIG. 16 illustrates a form in which the first imaging device 12 has a function of the image correction device 16. FIG. 17 illustrates a block diagram of an example of a functional configuration of the first imaging device 12 illustrated in FIG. 16. As illustrated in FIG. 17, the first imaging device 12 includes an imaging unit 50 and an image correction device 16 including a reception unit 40, a detection unit 42, and a correction unit 44. The detection unit 42 and the correction unit 44 have the same functions as those in the embodiments, and thus a description thereof will be omitted. On the other hand, the imaging unit 50 illustrated in FIG. 17 has a function of imaging a first image D1, which is a moving image of a subject, and outputting moving image data of the first image D1 obtained by imaging. In addition, the reception unit 40 receives the first image D1 (moving image data) output from the imaging unit 50, the second image D2 obtained by imaging by the second imaging device 14, and at least one piece of information on an imaging date and time or information on an imaging location corresponding to each of the first image D1 and the second image D2. Further, the present disclosure is not limited to the forms illustrated in FIG. 16 and FIG. 17, and the image correction device 16 may have an imaging function such as including the imaging unit 50.

In the embodiments, for example, as a hardware structure of a processing unit that executes various processing such as processing in the reception unit 40, the detection unit 42, and the correction unit 44, the following various processors may be used. The various processors include, as described above, a CPU, which is a general-purpose processor that functions as various processing units by executing software (program), and a dedicated electric circuit, which is a processor having a circuit configuration specifically designed to execute a specific process, such as a programmable logic device (PLD) or an application specific integrated circuit (ASIC) that is a processor of which the circuit configuration may be changed after manufacturing such as a field programmable gate array (FPGA).

One processing unit may be configured by one of these various processors, or may be configured by a combination of two or more processors of the same type or different types (for example, a combination of a plurality of FPGAs, or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be used. Secondly, as represented by a system on chip (SoC) or the like, a form in which a processor that realizes the function of the entire system including the plurality of processing units by one integrated circuit (IC) chip is used may be used. As described above, the various processing units are configured by using one or more various processors as a hardware structure.

Further, as the hardware structure of the various processors, more specifically, an electric circuit (circuitry) in which circuit elements such as semiconductor elements are combined may be used.

Further, in the embodiments, the form in which the image correction program 30 is stored (installed) in the storage unit 22 in advance has been described. On the other hand, the present disclosure is not limited thereto. The image correction program 30 may be provided by being recorded on a recording medium such as a compact disk read only memory (CD-ROM), a digital versatile disk read only memory (DVD-ROM), or a Universal Serial Bus (USB) memory. Further, the image correction program 30 may be downloaded from an external device via a network.

All documents, patent applications, and technical standards mentioned in this specification are incorporated herein by reference to the same extent as in a case where each document, each patent application, and each technical standard are specifically and individually described by being incorporated by reference.

EXPLANATION OF REFERENCES

10: imaging system
12: first imaging device
14: second imaging device
16: image correction device
20: CPU
21: memory
22: storage unit 23: display unit
24: operation unit
26: external I/F
29: bus
30: image correction program
40: reception unit
42: detection unit
44: correction unit
50: imaging unit
D1: first image
D2: second image
F11, F12, F13, F21, F22, F23: image (frame)
P: person
P1: face
PG1, PG2: person image
H: house
HG1, HG2: house image
S: sky
SG1, SG2: sky image
T: tree
TG1, TG2: tree image

What is claimed is:

1. An image correction device comprising:
a processor configured to:
receive a plurality of pieces of moving image data obtained by imaging by each of a plurality of imaging devices and at least one piece of information on an imaging date and time or information on an imaging location corresponding to each of the plurality of pieces of moving image data;
detect the same scene between images indicated by the plurality of pieces of moving image data based on the at least one piece of information corresponding to each of the plurality of pieces of moving image data which are received; and
extract, from each of the images indicated by the plurality of pieces of moving image data corresponding to the same scene which is detected, a subject which is common between the images and perform, on the corresponding images, color correction of making colors of the extracted subject similar to each other, wherein,
in a case where a plurality of the subjects are extracted, the processor performs, on all of the plurality of subjects, color correction of correcting each hue based on a correction amount of each subject making colors of the subject similar to each other as a whole.

2. The image correction device according to claim 1, wherein
the processor performs the color correction by making saturations of the extracted subject similar to each other in a hue-dependent manner.

3. The image correction device according to claim 2, wherein
the processor calculates a correction amount to be used for the color correction, based on images in which brightness values of the extracted subject are regarded to be the same, among the images indicated by the plurality of pieces of moving image data corresponding to the same scene.

4. The image correction device according to claim 3, wherein,
in a case where a plurality of the subjects are extracted, the processor calculates, for each of the subjects, a correction amount to be used for the color correction, based on images in which brightness values of the subject are regarded to be the same.

5. The image correction device according to claim 4, wherein,
after the color correction as first color correction is performed, in a case where second color correction different from the first color correction is further performed on an image indicated by one piece of moving image data among the plurality of pieces of moving image data, the processor performs the second color correction on images indicated by the other pieces of moving image data among the plurality of pieces of moving image data.

6. The image correction device according to claim 3, wherein,
after the color correction as first color correction is performed, in a case where second color correction different from the first color correction is further performed on an image indicated by one piece of moving image data among the plurality of pieces of moving image data, the processor performs the second color correction on images indicated by the other pieces of moving image data among the plurality of pieces of moving image data.

7. The image correction device according to claim 3, wherein
an upper limit of a correction amount of the color correction is predetermined according to a type of the subject.

8. The image correction device according to claim 2, wherein,
after the color correction as first color correction is performed, in a case where second color correction different from the first color correction is further performed on an image indicated by one piece of moving image data among the plurality of pieces of moving image data, the processor performs the second color correction on images indicated by the other pieces of moving image data among the plurality of pieces of moving image data.

9. The image correction device according to claim 2, wherein
an upper limit of a correction amount of the color correction is predetermined according to a type of the subject.

10. The image correction device according to claim 1, wherein
the processor calculates a correction amount to be used for the color correction, based on images in which brightness values of the extracted subject are regarded to be the same, among the images indicated by the plurality of pieces of moving image data corresponding to the same scene.

11. The image correction device according to claim 10, wherein,
in a case where a plurality of the subjects are extracted, the processor calculates, for each of the subjects, a correction amount to be used for the color correction, based on images in which brightness values of the subject are regarded to be the same.

12. The image correction device according to claim 11, wherein,
after the color correction as first color correction is performed, in a case where second color correction different from the first color correction is further performed on an image indicated by one piece of moving image data among the plurality of pieces of moving image data, the processor performs the second color correction on images indicated by the other pieces of moving image data among the plurality of pieces of moving image data.

13. The image correction device according to claim 11, wherein
an upper limit of a correction amount of the color correction is predetermined according to a type of the subject.

14. The image correction device according to claim 10, wherein,
after the color correction as first color correction is performed, in a case where second color correction different from the first color correction is further performed on an image indicated by one piece of moving image data among the plurality of pieces of moving image data, the processor performs the second color correction on images indicated by the other pieces of moving image data among the plurality of pieces of moving image data.

15. The image correction device according to claim 3, wherein
an upper limit of a correction amount of the color correction is predetermined according to a type of the subject.

16. The image correction device according to claim 1, wherein,
after the color correction as first color correction is performed, in a case where second color correction different from the first color correction is further performed on an image indicated by one piece of moving image data among the plurality of pieces of moving image data, the processor performs the second color correction on images indicated by the other pieces of moving image data among the plurality of pieces of moving image data.

17. The image correction device according to claim 1, wherein
an upper limit of a correction amount of the color correction is predetermined according to a type of the subject.

18. An imaging device comprising:
an imaging sensor that images a moving image of a subject and outputs moving image data obtained by imaging, and
a processor configured to:
receive a plurality of pieces of moving image data, which include moving image data output from the imaging sensor and moving image data obtained by imaging by another imaging device, and at least one piece of information on an imaging date and time or information on an imaging location corresponding to each of the plurality of pieces of moving image data;
detect the same scene between images indicated by the plurality of pieces of moving image data based on the at least one piece of information corresponding to each of the plurality of pieces of moving image data which are received; and
extract, from each of the images indicated by the plurality of pieces of moving image data corresponding to the same scene which is detected, a subject which is common between the images and perform, on the corresponding image, color correction of making colors of the extracted subject similar to each other, wherein,
in a case where a plurality of the subjects are extracted, the processor performs, on all of the plurality of subjects, color correction of correcting each hue based on a correction amount of each subject making colors of the subject similar to each other as a whole.

19. An image correction method executed by a computer, the method comprising:
receiving a plurality of pieces of moving image data obtained by imaging by each of a plurality of imaging devices and at least one piece of information on an imaging date and time or information on an imaging location corresponding to each of the plurality of pieces of moving image data;
detecting the same scene between images indicated by the plurality of pieces of moving image data based on the at least one piece of information corresponding to each of the plurality of pieces of moving image data which are received; and
extracting, from each of the images indicated by the plurality of pieces of moving image data corresponding to the detected same scene, a subject which is common between the images and performing, on the corresponding image, color correction of making colors of the extracted subject similar to each other,
in a case where a plurality of the subjects are extracted, performing, on all of the plurality of subjects, color correction of correcting each hue based on a correction amount of each subject making colors of the subject similar to each other as a whole.

20. A non-transitory computer readable recording medium storing an image correction program causing a computer to execute a process comprising:
receiving a plurality of pieces of moving image data obtained by imaging by each of a plurality of imaging devices and at least one piece of information on an imaging date and time or information on an imaging location corresponding to each of the plurality of pieces of moving image data;
detecting the same scene between images indicated by the plurality of pieces of moving image data based on the at least one piece of information corresponding to each of the plurality of pieces of moving image data which are received; and
extracting, from each of the images indicated by the plurality of pieces of moving image data corresponding to the detected same scene, a subject which is common between the images and performing, on the corresponding image, color correction of making colors of the extracted subject similar to each other,
in a case where a plurality of the subjects are extracted, performing, on all of the plurality of subjects, color correction of correcting each hue based on a correction amount of each subject making colors of the subject similar to each other as a whole.

* * * * *